(12) United States Patent  (10) Patent No.: US 7,949,744 B2
Kortright  (45) Date of Patent: *May 24, 2011

(54) SYSTEM AND METHOD FOR SYNCHRONIZING THE CONFIGURATION OF DISTRIBUTED NETWORK MANAGEMENT APPLICATIONS

(75) Inventor: Kris Kortright, Herndon, VA (US)

(73) Assignee: Time Warner Cable, Inc., New York, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/426,360

(22) Filed: Apr. 20, 2009

(65) Prior Publication Data

US 2009/0204699 A1  Aug. 13, 2009

Related U.S. Application Data

(63) Continuation of application No. 10/456,197, filed on Jun. 6, 2003, now Pat. No. 7,523,184, which is a continuation-in-part of application No. 10/335,272, filed on Dec. 31, 2002, now abandoned.

(51) Int. Cl.
*G06F 15/173* (2006.01)

(52) U.S. Cl. ........................................ 709/223; 709/220

(58) Field of Classification Search .................. 709/203, 709/220, 221, 223
See application file for complete search history.

(56) References Cited

U.S. PATENT DOCUMENTS

| | | | |
|---|---|---|---|
| 5,758,083 A | | 5/1998 | Singh et al. |
| 5,835,911 A | * | 11/1998 | Nakagawa et al. .................. 1/1 |
| 5,909,568 A | | 6/1999 | Nason |
| 5,999,978 A | | 12/1999 | Angal et al. |
| 6,023,727 A | * | 2/2000 | Barrett et al. .................. 709/221 |
| 6,128,656 A | | 10/2000 | Matchefts et al. |
| 6,144,992 A | * | 11/2000 | Turpin et al. .................. 709/208 |
| 6,222,827 B1 | | 4/2001 | Grant et al. |
| 6,237,092 B1 | * | 5/2001 | Hayes, Jr. ..................... 713/100 |
| 6,295,558 B1 | | 9/2001 | Davis et al. |
| 6,345,239 B1 | | 2/2002 | Bowman-Amuah |
| 6,363,411 B1 | * | 3/2002 | Dugan et al. .................. 709/202 |
| 6,405,219 B2 | | 6/2002 | Saether et al. |
| 6,539,494 B1 | * | 3/2003 | Abramson et al. ................. 714/4 |
| 6,697,852 B1 | * | 2/2004 | Ryu .............................. 709/220 |

(Continued)

OTHER PUBLICATIONS

"Architecting Carrier-Class Network Management Systems," White Paper, Equipe Communications, 2000.

(Continued)

*Primary Examiner* — Ario Etienne
*Assistant Examiner* — El Hadji Sall
(74) *Attorney, Agent, or Firm* — The Marbury Law Group, PLLC

(57) ABSTRACT

A change management system to synchronize the configuration of network management applications. Traditional network management systems are maintained by hand-entering device lists into individual network management applications with no common-ties between the different applications. Whenever a network management application is changed or upgraded, it frequently becomes necessary to insure that the upgrade is populated throughout the network in order for devices to talk to one another in an error free way. The present invention is a system and method that automates the change management process in a real-time using a two-way communications model that permits a central database to affect changes on all or some network management applications/systems in the field, while also allowing those same field systems to affect the central database thereby reducing the time required for updating and monitoring a system when device changes take place.

26 Claims, 10 Drawing Sheets

U.S. PATENT DOCUMENTS

| | | | |
|---|---|---|---|
| 7,051,327 B1 * | 5/2006 | Milius et al. | 717/177 |
| 7,130,870 B1 | 10/2006 | Pecina et al. | |
| 7,254,640 B2 * | 8/2007 | Alexander | 709/239 |
| 7,627,694 B2 * | 12/2009 | Sreenivasan et al. | 709/251 |
| 2002/0012011 A1 | 1/2002 | Roytman et al. | |
| 2002/0049845 A1 * | 4/2002 | Sreenivasan et al. | 709/226 |
| 2002/0057018 A1 | 5/2002 | Branscomb et al. | |
| 2003/0009552 A1 | 1/2003 | Benfield | |
| 2003/0028624 A1 | 2/2003 | Hasan et al. | |
| 2003/0191773 A1 * | 10/2003 | Alexander | 707/102 |
| 2004/0064571 A1 * | 4/2004 | Nuuttila | 709/229 |

OTHER PUBLICATIONS

Supplementary European Search Report, European Application 03734453.8. European Patent Office, Aug. 2, 2010.

* cited by examiner

FIGURE 6

Core Engine /autocontroller Transfer File Formats

| File Type | Filename End-Tag | Directory/Filename | Purpose |
|---|---|---|---|
| Device list | dsm | /opt/vis/visionary/dsm.d/dsm<x>/utils/cfg.data | Visionary device list. |
| Reconfig list | cfg | /opt/vis/visionary/apisc/incoming/ | List of Visionary devices to reconfigure. |
| Command list | idx | /opt/vis/visionary/apisc/incoming/ | List of shell commands for which to execute & return STDOUT. |
| Template | tmp | /opt/vis/visionary/dsm.d/utils/templates/ | Visionary template to install. |
| Rules sensativity file | sen | /opt/vis/visionary/agent/rule_adj.conf | Visionary agent rules sensativity file to install. |
| Agent rules file | rul | /opt/vis/visionary/agent/rulex.enc | Visionary agent rules event rules file. |
| Agent probe rules file | pru | /opt/vis/visionary/agent/visprobe.rules | Visionary agent Probe rules file to install. |
| Agent probe props file | pro | /opt/vis/visionary/agent/visprobe.props | Visionary agent Properties file to install. |
| Agent binary | abn | /opt/vis/visionary/agent/agent | Visionary agent binary update. |
| Agent config file | agc | /opt/vis/visionary/agent/agent.conf | Visionary agent configuration file. |
| DSM binary | dbn | /opt/vis/visionary/dsm.d/dsm | Visionary DSM binary update. |
| DSM prefix | dsp | /opt/vis/visionary/dsm.d/dsm<x>/dsm_cfg/prefix.cfg | Visionary DSM config-file prefix update. |
| Broker binary | bbn | /opt/vis/visionary/dsm.d/broker | Visionary Broker binary update. |
| Broker config file | bcf | /opt/vis/visionary/dsm.d/broker.conf | Visionary Broker configuration file. |
| Autoconfig binary | cbn | /opt/vis/visionary/dsm.d/utils/autoconfig | Visionary Auto(re)config binary update. |
| ApiscAC binary | vbn | /opt/vis/visionary/apisc/apiscac | Apisc Autocontroller binary update. |
| ApiscAC config file | vcf | /opt/vis/visionary/apisc/apiscac.cfg | Apisc Autocontroller configuratin file. |
| ISM config file | ism | /opt/Omnibus/profiles/active | Netcool ISM configuration file. |
| ISM binary | isb | /opt/Omnibus/monitors/solaris2 | |
| EventReporter config file | erc | /opt/nms/er/incoming | EventReporter configuration file. |
| EventReporter binary | erb | | |
| Netcool probe binary | ncp | /opt/Omnibus/probes/solaris2/nco_p_<probe type> | Netcool probe binary update. |
| Netcool probe rules file | npp | /opt/Omnibus/probes/solaris2/<probe type>.rules | Netcool probe rules file update. |
| Netcool probe props file | npr | /opt/Omnibus/probes/solaris2/<probe type>.props | Netcool probe properties file update. |

FIGURE 7
Sample Fields From The Core Engine/Autocontroller Meta-Configuration File

| Id# | Attribute | Value |
|---|---|---|
| 1 | ApiscMetaConfigVersion | 1.0.1 |
| 1 | Application | ApiscCore |
| 1 | Hostname | herprd15 |
| 1 | ServerIP | 1.2.3.4 |
| 1 | IncomingDir | /nms/accore/incoming |
| 2 | Application | autocontroller |
| 2 | Hostname | herpol02 |
| 2 | ServerIP | 5.6.7.8 |
| 2 | PollingSite | HRNVA-RDC |
| 2 | BuddySite | MPHTN-RDC |
| 3 | Application | Visionary |
| 3 | Server | herpol02 |
| 3 | ServerIP | 24.30.200.16 |
| 3 | PollingSite | HRNVA-RDC |
| 3 | PollingFrom | HRNVA-RDC |
| 2 | HostServer | Primary |
| 2 | DSMNumber | 1 |
| 2 | Disposition | Production |
| 2 | Status | Active |

FIGURE 8

| Loopback IP | SNMP Index | OID | Polling Frequency | Status |
|---|---|---|---|---|
| 24.28.222.232 | 0 | 1.3.6.1.4.1.9.2.1.58.0 | 60 | 0 |
| 24.28.222.232 | -1 | 1.3.6.1.4.1.9.2.2.1.1.2 | 60 | 0 |
| 24.28.222.232 | -1 | 1.3.6.1.4.1.9.2.2.1.1.6 | 60 | 0 |
| 24.28.222.232 | -1 | 1.3.6.1.4.1.9.2.2.1.1.8 | 60 | 0 |
| 24.28.222.233 | 0 | 1.3.6.1.4.1.9.2.1.58.0 | 300 | 0 |
| 24.28.222.233 | 1 | 1.3.6.1.4.1.9.2.2.1.1.2 | 300 | 0 |
| 24.28.222.233 | 1 | 1.3.6.1.4.1.9.2.2.1.1.6 | 300 | 0 |
| 24.28.222.233 | 1 | 1.3.6.1.4.1.9.2.2.1.1.8 | 300 | 0 |
| 24.28.222.233 | 2 | 1.3.6.1.4.1.9.2.2.1.1.2 | 300 | 0 |
| 24.28.222.233 | 2 | 1.3.6.1.4.1.9.2.2.1.1.6 | 300 | 0 |
| 24.28.222.233 | 2 | 1.3.6.1.4.1.9.2.2.1.1.8 | 300 | 0 |

SYSTEM AND METHOD FOR SYNCHRONIZING THE CONFIGURATION OF DISTRIBUTED NETWORK MANAGEMENT APPLICATIONS

CROSS REFERENCE TO RELATED APPLICATIONS

This application is a continuation of application Ser. No. 10/456,197 filed Jun. 6, 2003 now U.S. Pat. No. 7,523,184, which is a continuation in part of application Ser. No. 10/335,272 filed Dec. 31, 2002 now abandoned. The 10/456,197 and the 10/335,272 applications are incorporated by reference herein, in their entireties, for all purposes.

FIELD OF THE INVENTION

The present invention relates to network management. More specifically, the present invention is an automated change management system and method to manage diverse management functions across a network in an automated fashion.

BACKGROUND OF THE INVENTION

It is difficult to imagine a communication process that does not involve a collection of devices connected by a network. Networks carry voice and data communications for communication, entertainment, business, and defense endeavors to name but a few. For a variety of reasons, most networks are collections of smaller sub-networks that are managed first at the sub-network level and then at the integrated network level. Management comprises configuring devices for connection to the network, monitoring and reporting on network and device loads, and managing device failure.

A device is often managed by a variety of applications depending on the function to be managed. For example, the workload of a device may be managed by application A supplied by vendor A and the configuration of a device may be managed by application B supplied by vendor B. In this example, application A is configured via a script to manage device A and reports its results to a workload database. Application B is configured using a text file to manage the configuration of device B and reports its results to a configuration database. Typically, applications A and B cannot directly communicate with each other or share data.

In modern day networks such as wireless networks, intranets or the Internet, there are a number of network devices of various types. Such network devices may be workstations, routers, servers, and a wide variety of other smart devices that appear on networks. Network management tools have evolved to manage these devices. As networks have increased in size and complexity, network management functions have become increasingly resource intensive.

Network management comprises a number of functions, including (but without limitation) fault management, configuration management, performance management, security management, inventory management and cost management. Of these functions, configuration management is of particular importance as it affects in varying degree the effectiveness of the other network management systems in managing all of the other functions.

Most devices and applications on a network (sometimes collectively referred to as "objects" or "network management objects") are designed to be configured, thus broadening the applications for which a particular object can be used. The information comprising an object's configuration is both object and context dependent. That is, the configuration of a device may depend on the device, where in a network it is installed, what it is connected to, what applications it is intended to run, and the like. In order for a network to operate efficiently, the configuration of the various objects comprising the network must be known at all times. An unplanned change in the configuration of a router, for example, may cause the network performance to deteriorate or to fail altogether, may result in increased error reporting and error correction processing time, and cause the network operator to expend resources to locate and correct the configuration error.

Network management tools have been developed to detect changes in the configurations of critical network components. These tools monitor the configuration files of such objects, issue alarms when a change is detected, and offer manual or automatic restoration of the changed configuration file to a file known to be good. However, current configuration monitoring tools are reactionary. Such tools can determine that a configuration has changed, but cannot initiate a reconfiguration of specific devices or applications on the network or sub-network, or relate the configuration of one device on a network to another device on that network without human intervention. Rather, many traditional network management systems are maintained by hand-entering device lists into individual network management applications with no common-ties between the different applications.

Whenever a network device is changed or upgraded, it frequently becomes necessary to insure that the upgrade is populated throughout the network in order for devices to talk to one another in an error free way. The difficulty with updating distributed network devices is that this typically occurs on a device-by-device basis. Therefore the possibility of human error is ever present. Misentering or omitting device information into different network management applications results in a network that is not effectively managed. Further, if different network management applications are present on various network devices, over time, the network applications become increasingly asynchronous resulting in critical failures and the potential for loss of visibility on the network of various devices.

At any point in time, it is desirable for a network management application to know the configuration of each configurable device that such network management application is managing. This is accomplished by the network management application polling the managed devices and keeping a record of the polled data. However, networks with a large number of network management applications have difficulty synchronizing against a single inventory of devices and synchronizing device status over all of the network management applications. And, as previously noted, the network management applications are typically from diverse vendors and may not be able to communicate with each other. The result is that over the network, the data used to manage the configuration of network devices and network device polling applications is not current, and becomes less current (more asynchronous) as time goes on.

Various approaches to improving network management systems have been disclosed. U.S. Pat. No. 5,785,083 ('083 patent) to Singh, et al. entitled "Method And System For Sharing Information Between Network Managers," discloses a technique for managing a network by sharing information between distributed network managers that manage a different portion of a large network. Databases in the different network managers can be synchronized with each other. The information that is shared is to be used by an end-user who monitors the network and takes corrective action when necessary.

U.S. Pat. No. 6,295,558 ('558 patent) to Davis, et. al., entitled "Automatic Status Polling Failover For Devices In A Distributed Network Management Hierarchy," discloses an automatic failover methodology whereby a central control unit, such as a management station, will automatically take-over interface status polling of objects of a collection station that is temporarily unreachable. The '558 patent teaches a failover methodology that reassigns polling responsibility from a failed collection station to a central control unit (such as a management station). A polling application at the central control unit obtains the topology of the failed collection station and performs polling until the polling station returns to operational status.

U.S. Pat. No. 6,345,239 (the '239 patent) to Bowman-Amuah, entitled "Remote Demonstration Of Business Capabilities In An E-Commerce Environment," discloses and claims a system, method and article of manufacture for demonstrating business capabilities in an e-commerce environment. The '239 patent discloses, but does not claim, network management functionality that refers to synchronization of configuration data over a communication system as an objective. The disclosures, made in the context of a discussion of a network configuration and re-routing sub-process, describe functions but not means.

U.S. Patent Application 20020057018 (the '018 application) to Branscomb, et. al., entitled "Network device power distribution scheme," discloses and claims a telecommunications network device including at least one power distribution unit capable of connecting to multiple, unregulated DC power feeds. The '018 application further discloses (but does not claim) an approach to a network management system that features a single data repository for configuration information of each network device. Network servers communicate with network devices and with client devices. Client devices communicate with a network administrator. The administrator can use a client to configure multiple network devices. Client devices also pass configuration requirements to the network servers and receive reports from network relating configuration data of network devices. According to this approach, pushing data from a server to multiple clients synchronizes the clients with minimal polling thus reducing network traffic. Configuration changes made by the administrator directly are made to the configuration database within a network device (through the network server) and, through active queries, automatically replicated to a central NMS database. In this way, devices and the NMS are always in synch.

The approaches described in these references are those that relate to management of the network manually. What would be particularly useful is a system and method that automates the change management process in real-time using a two-way communications model that permits a central database to affect changes on all or some network management applications/systems in the field, while also allowing those same field systems to affect the central database. It also would be desirable for such a system and method to update all network management applications on the network upon the occurrence of a change in a network device and to manage failover through logically assigned buddies. Finally, such a system and method would also decrease the errors associated with human intervention to update network management applications.

SUMMARY OF THE INVENTION

An embodiment of the present invention is a system and method for managing and synchronizing network management applications from a common source. A change management process is automated by employing a real time two way communications model that permits a central database comprising the latest network management software and configuration to effect changes on all or some network management applications and systems in the field.

It is therefore an aspect of the present invention to eliminate human errors associated with updating network management applications.

It is a further aspect of the present invention to insure that network applications are synchronized when a network device is added or removed, or when the configuration of a network device is changed.

It is yet another aspect of the present invention to significantly reduce the time required to update network monitoring systems when device changes occur in the network.

It is still another aspect of the present invention to create and install a configuration file on the network management system applications for any new network device added to the network.

It is still another aspect of the present invention to provide application fail over capabilities for those devices using the same application and between different applications on a network according to certain rules and based on logically assigned backup servers ("buddies").

It is yet another aspect of the present invention to automatically detect changes in devices on the network and immediately update all network management system applications associated with changed devices.

It is still another aspect of the present invention to update a central database concerning all network management applications and devices on the network.

It is still another aspect of the present invention to maintain complete synchronization of all devices that are being monitored on a network.

These and other aspects of the present invention will become apparent from a review of the description that follows.

In an embodiment of the present invention, a change management engine synchronizes the configuration of distributed network management applications, as well as synchronizes device status from those same distributed network management applications with a central database. "Change management" as used in this context means the process by which network management poller and aggregation applications are synchronized to the exact configurations of the devices they monitor in real-time without human intervention. The network can be a wired or wireless network. Further, embodiments of the present invention operate on an intranet, the Internet, or any other wired or wireless network that is to be managed as an entity. These embodiments operate in an application-diverse environment allowing the synchronization of networks that use applications of different vendors to perform various network management functions.

In an embodiment of the present invention, the change management process is automated by employing a real time two way communications model that permits a central database comprising the latest network management software and configuration to effect changes on all or some network management applications and systems in the field. In this embodiment, field systems also affect the central database by transmitting polled information into that database. Each network device is entered into a central database one time. After the initial data entry, this embodiment of the present invention handles all of the processes associated with configuring different and distributed network management systems and applications in the field. Thus, this embodiment of the present invention acts as a manager of other system managers in order to insure that all network management applications are synchronized across the network and binds many disparate functions of change management under one control model. Further, automating the configuration process reduces the risk that human error will disrupt the monitoring of critical systems.

In yet another embodiment of the present invention, the process of handing over tasks of a failed monitoring device (fail over) is managed in real-time fail over capability. This embodiment allows a single graphical user interface to be the means of monitoring a plurality of devices over the network. The plurality of devices is polled by any number of different servers and applications with responses from the polling reported via Simple Network Management Protocol (SNMP) to a central database. Thus a unified view of the status of each of the devices on the network is created and monitored.

BRIEF DESCRIPTION OF THE DRAWINGS

FIG. 6 illustrates the core engine/autocontroller transfer file formats as used in an embodiment according to the present invention.

FIG. 7 illustrates the structure of a meta file as used in an embodiment according to the present invention.

FIG. 8 the structure of an OID configuration file as used in an embodiment according to the present invention.

DETAILED DESCRIPTION OF THE INVENTION

The description of the present invention that follows utilizes a number of acronyms the definitions of which are provided below for the sake of clarity and comprehension.
APISC—Application Programming Interface Super Controller
ASCII—American Standard Code for Information Interchange
DIDB—Device Inventory Database
DPM—Data Poller Module
DSM—Distributed Status Monitor
FTP—File Transfer Protocol
GUI—Graphical User Interface
ID—Identification
IP—Internet Protocol
NDB—Network Database
NMS—Network Management System
NOC—Network Operations Center
Object or Network Management Object—a network application or network device that is configurable.
ODBC—Open Database Connectivity
OID—Object Identifier
OSPF—Open Shortest Path First Interior Gateway Protocol
RDC—Regional Data Center
SNMP—Simple Network Management Protocol
TMP—Temporary In addition, certain NMS software products are referred to by their product names, which include the following:
Netcool (MicroMuse, Inc.)
Visionary (MicroMuse, Inc.)
Internet Service Monitor or "ISM" (MicroMuse, Inc.)
Remedy (BMC Software, Inc.)

Figure 1:
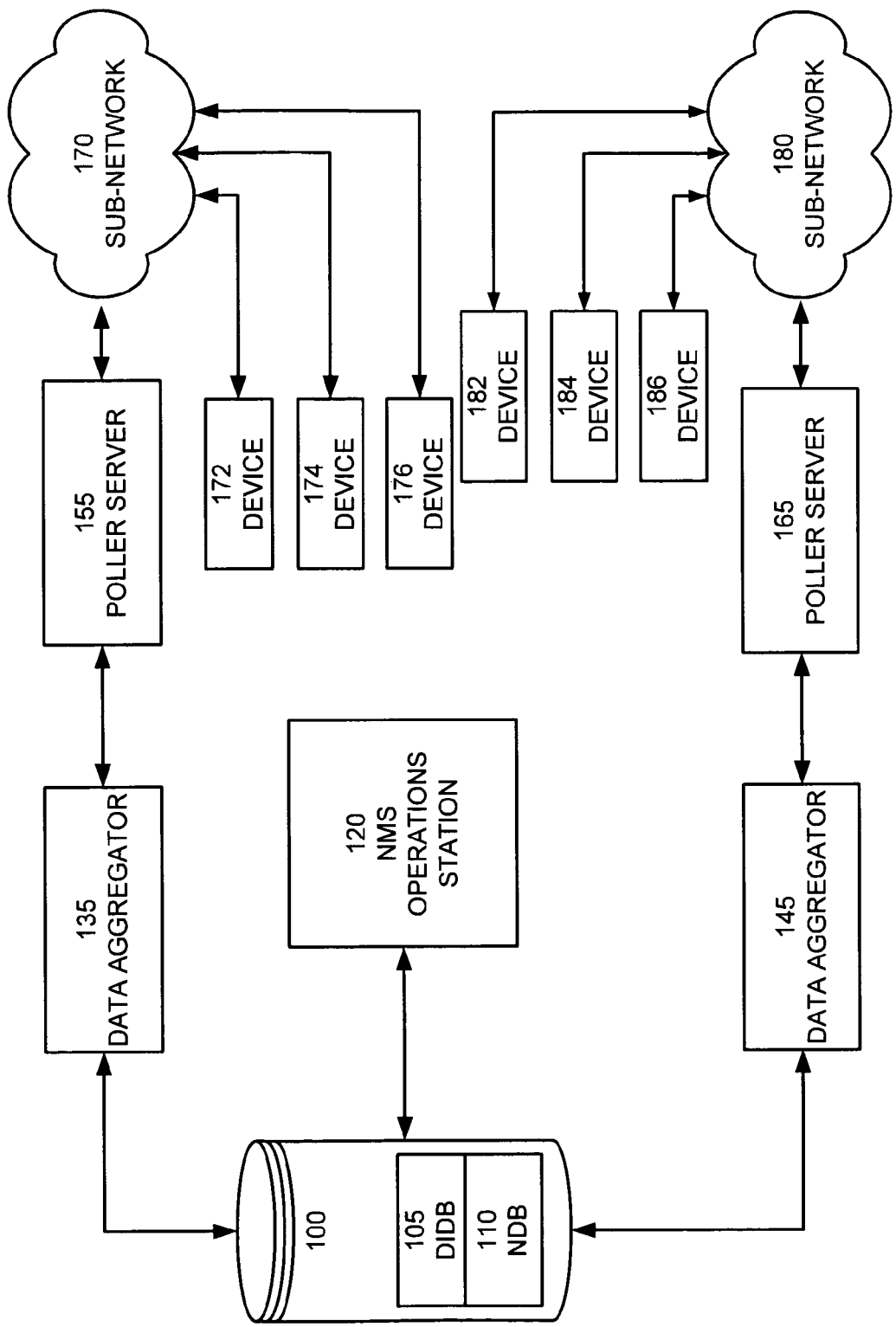
FIG. 1 illustrates elements of a typical network management system.

Referring to FIG. 1, the elements of a network management system (NMS) are illustrated. NMS operations station 120 is linked to a central database 100. Central database 100 comprises a device inventory database (DIDB) 105 and the network database (NDB) 110. The DIDB 105 stores configuration data for applications used to manage the network management system (NMS). For each sub-network managed by network management system, configuration data for devices on that sub-network are acquired by the associated poller server (for example, poller server 155), aggregated by the associated data aggregator (for example, data aggregator 135), and stored in the NDB 110.

Central database 100 is linked to data aggregators 135, 145. Data aggregators 135 and 145 are linked, respectively, to NMS poller servers 155 and 165. NMS poller server 155 monitors sub-network 170 and NMS poller server 165 monitors sub-network 180. Sub-network 170 comprises devices 172, 174, and 176, and sub-network 180 comprises devices 182, 184, and 186. By way of illustration, and not as a limitation, a "device" comprises a router, a switch, a modem, a server, or other configurable device and a software application. For ease of discussion, only two sub-networks have been illustrated in FIG. 1, but this is not meant as a limitation. As will be appreciated by those skilled in the art of the present invention, any number of sub-networks may be under the management of the network management system without departing from the scope of the present invention. As illustrated in FIG. 1, NMS poller server 155 and NMS poller server 165 are linked to each other to create redundancy should one of the NMS poller servers fail. Additionally, for purposes of illustration and not as a limitation only two NMS poller server/data aggregator pairs are shown in FIG. 1. As will be apparent to those skilled in the art of the present invention, a plurality of NMS poller server/data aggregator pairs may be used to manage either sub-network.

Each NMS poller server/data aggregator pair manages the sub-network to which it is assigned by polling the sub-network for relevant data. The particular tasks performed by a NMS poller server depend on the application software running on that server. Typical tasks include monitoring network devices for changes in configuration, performance, load, and environmental parameters, analyzing the data received from network devices, and sending the data to the central database 100 for further processing by NMS operations station 120.

In the NMS illustrated in FIG. 1, the management of the NMS poller servers and data aggregators is through NMS operations station 120. The NMS operations station 120 is monitored by human operators who evaluate events reported to the central database and make decisions about problem resolution.

Figure 2A:
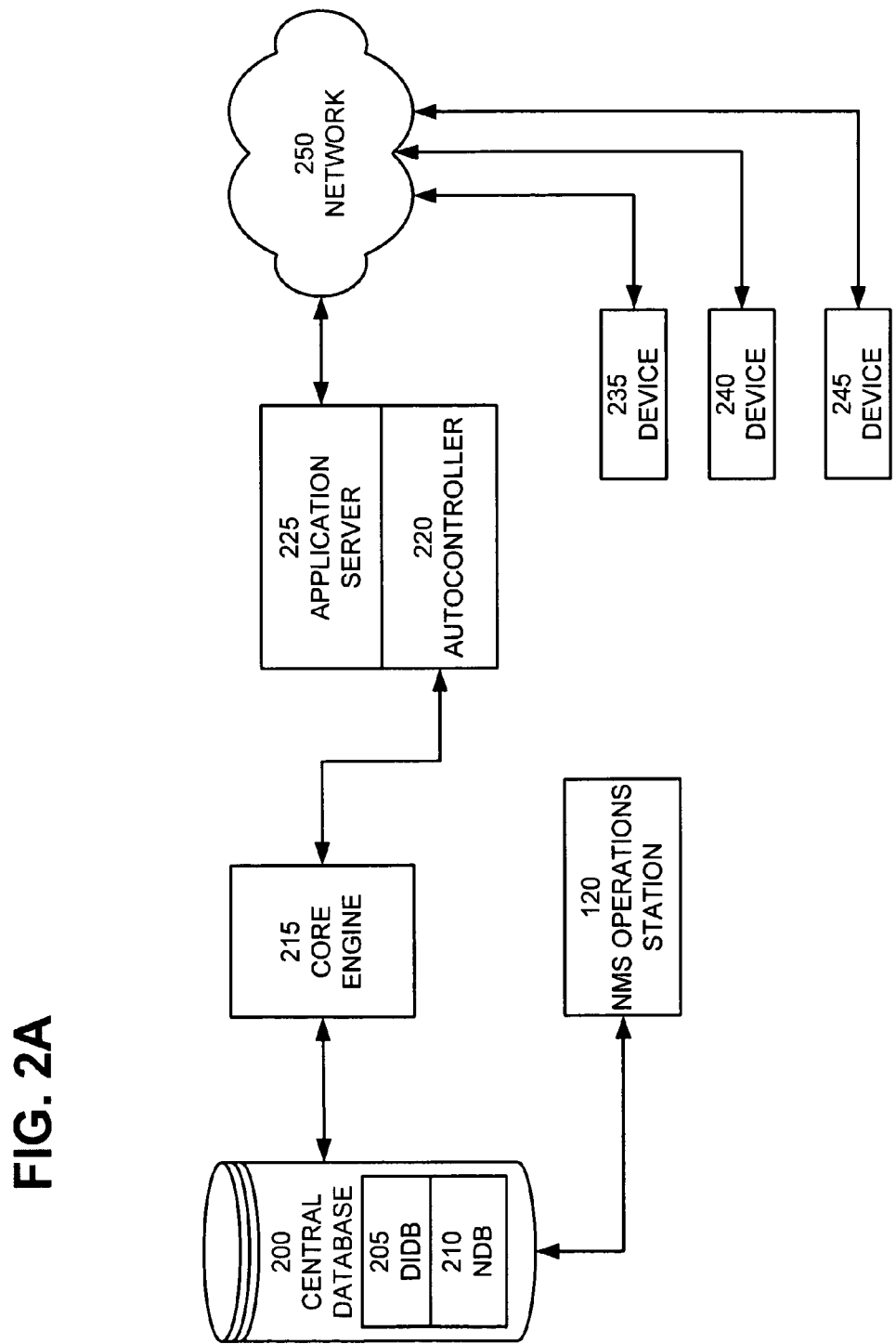
FIG. 2A illustrates elements of a network manage system with a change management system added according to an embodiment of the present invention.

Referring now to FIG. 2A, a portion of a network management system is illustrated with the addition of elements comprising a change management system according to an embodiment of the present invention. The central database 200 (comprising DIDB 205 and NDB 210) is linked to core engine 215. Core engine 215 is linked to auto controller 220. Autocontroller 220 is co-located on an application server 225. Application server 225 is linked to one or more devices 230, 235, and 240 over network 250. Devices 230, 235, and 240 comprise configurable devices and applications. Application server 225 manages these devices according to the task to which application server 225 is assigned.

Figure 2B:
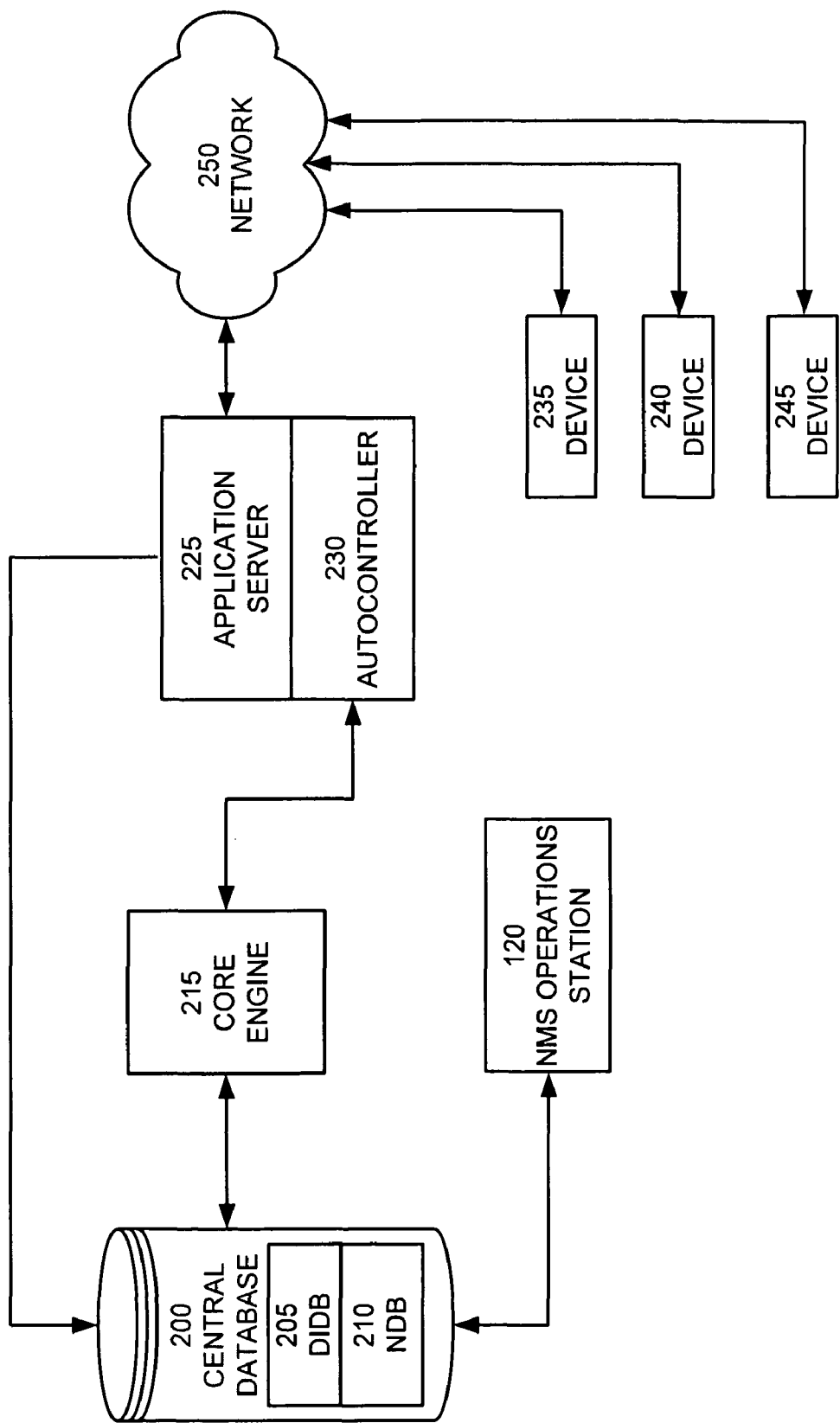
FIG. 2B illustrates elements of a network manage system comprising an application server running a device information gathering application in a change management system according to an embodiment of the present invention.
Figure 2C:
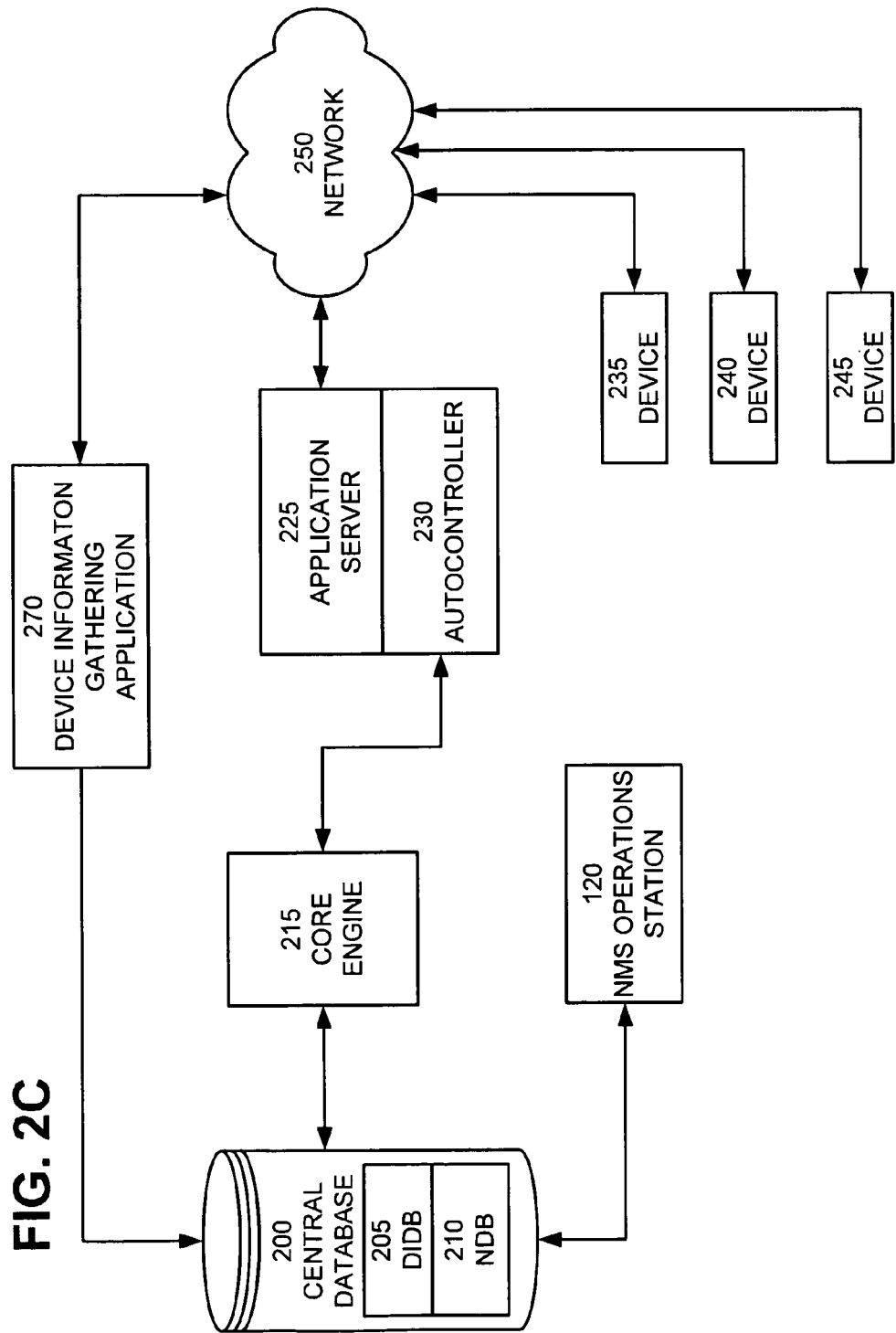
FIG. 2C illustrates elements of a network manage system comprising a discrete device information gathering application in a change management system according to an embodiment of the present invention.

In an embodiment of the present invention, application server 225 comprises a device information gathering application (as illustrated in FIG. 2B). In an alternate embodiment, the device gathering function is performed by a device information gathering application 270 that is not operated by application server 225 (as illustrated in FIG. 2C). As will be apparent to those skilled in the art, application server 225 may implement one of a number of network management tools without departing from the scope of the present invention. By way of illustration, application server 225 may be a reporting engine, a network portal, or an access control server.

In an embodiment of the present invention and as illustrated in FIG. 2A, autocontroller 220 resides on application server 225. In an alternate embodiment, autocontroller 220 comprises a discrete functional component that is linked to application server 225. Autocontroller 220 manages, configures, and monitors all of the applications running on application server 225. Core engine 215 acts as the hub of the network management system configuration control functions. While core engine 215 is illustrated in FIGS. 2A, 2B, and 2C as a stand-alone component, the invention is not so limited. As will be appreciated by those skilled in the art, the functions of core engine 215 may be integrated with other network management functions without departing from the scope of the present invention.

Core engine 215 reads device, site, polling, and configuration data from the DIDB 205, analyzes configuration data, builds application configuration files when needed, updates the DIDB 210 with the most current data, schedules device polling, and manages and monitors auto controller 220. Together, the core engine 215 and autocontroller 220 provide an existing network management system with the capability to automate the change management process in real-time.

In another embodiment, the autocontroller resides on each server that contains network management applications requiring core engine control. The autocontroller installs updated configuration files, launches and restarts applications, executes shell commands, parses and analyzes output files, returns any requested results back to be the core engine, and backs up another autocontroller (a "buddy"). With respect to this latter function, an autocontroller is capable of performing the functions of its buddy autocontroller should the buddy autocontroller experience a failure. Additionally, each autocontroller comprises redundancy features to determine when the assigned buddy autocontroller fails or becomes unreachable. While FIGS. 2A, 2B, and 2C illustrate a single autocontroller managing a single application server, the present invention is not so limited. Any number of autocontrollers may each be paired with an application server under the control of a core engine to implement a change management system on any size network.

The network management systems illustrated in FIG. 1 and FIGS. 2A, 2B, and 2C are, of course, simplified views of the architecture of a functioning NMS. What these views illustrate is that the addition of the elements of the change management system of the present invention significantly increases the ability of NMS to manage itself without the need for human intervention. Thus, the core engine and the auto controller of the present invention reside within a network management system and mange the systems that manage the network.

Figure 3:
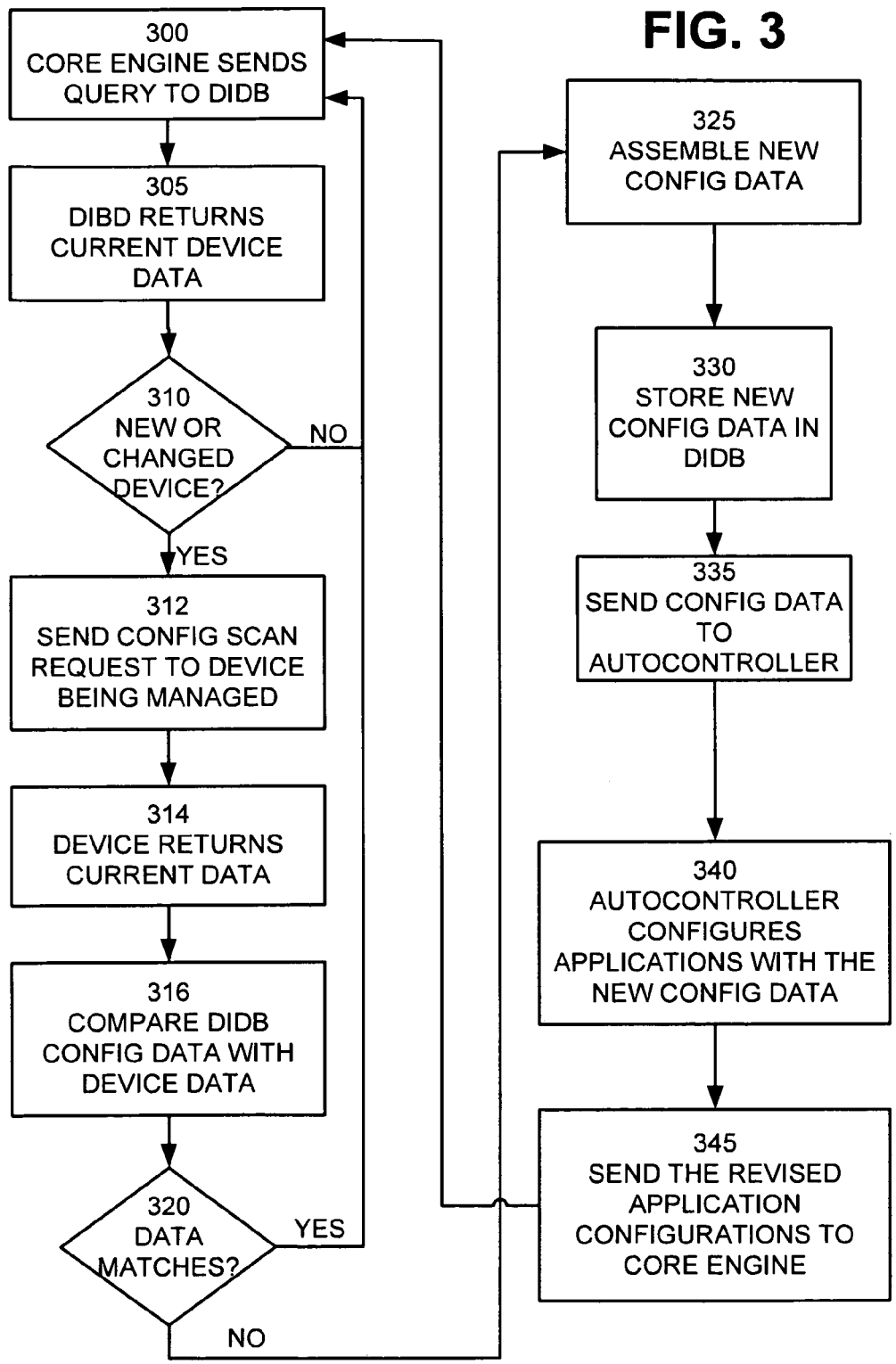
FIG. 3 illustrates a data management workflow of a change management system according to an embodiment of the present invention.

Referring to FIG. 2A and FIG. 3 (SEE REVISED FIG. 3-PAGE AFTER NEXT), a data management workflow of a change management system according to an embodiment of the present invention is illustrated. The workflow is described in reference to a network management system illustrated in FIG. 2A. In this embodiment, the core engine 215 sends a query to the device inventory database (DIDB) 300 to obtain information relating to devices (235, 240, 245) controlled by application server 225. The DIDB returns the current device data 305 and the core engine 215 checks the results for devices that are new or modified since the last time the query was run 310. For each device determined to be new or modified, the core engine 215 sends an initiate configuration scan request 312. The current configuration data of a device (device 235 is selected for ease of discussion) is returned from the device to the core engine 314 and compared to the configuration data stored in the DIDB (205) 316. If data from the DIDB (205) and the device (235) do not match 320, the core engine assembles new configuration data 325 for each application running on application server (225).

The new configuration data are stored in the DIDB (205) 330 and then sent to the autocontroller (220) 335. The autocontroller (220) configures the applications running on application server (225) with the new configuration data 340. As discussed below, the configuration data is customized to the format expected by each application running on the application server (225). The autocontroller (220) sends the revised application configuration data back to the core engine (215) 345. The revised configuration data are again compared with the data in DIDB (205) to ensure that the DIDB and the application server (225) applications are in sync as to the current configuration of the device (235). If variations are detected, the process of updating the application server is repeated.

The change management process illustrated in FIG. 3 is cyclical in nature and works in the real-time, requiring no human intervention to maintain accurate data acquisition and device monitoring. At the end of this cycle, the network is in sync with respect to device and application configurations, a result achieved without human intervention.

EXEMPLARY EMBODIMENTS

The exemplary embodiments that follow are intended to illustrate aspects of the present invention, but are not meant as limitations. As will be apparent to those skilled in the art, the present invention may be practiced in embodiments other than the exemplary embodiments described herein without departing from the scope of the present invention.

A. The Core Engine

Figure 4:
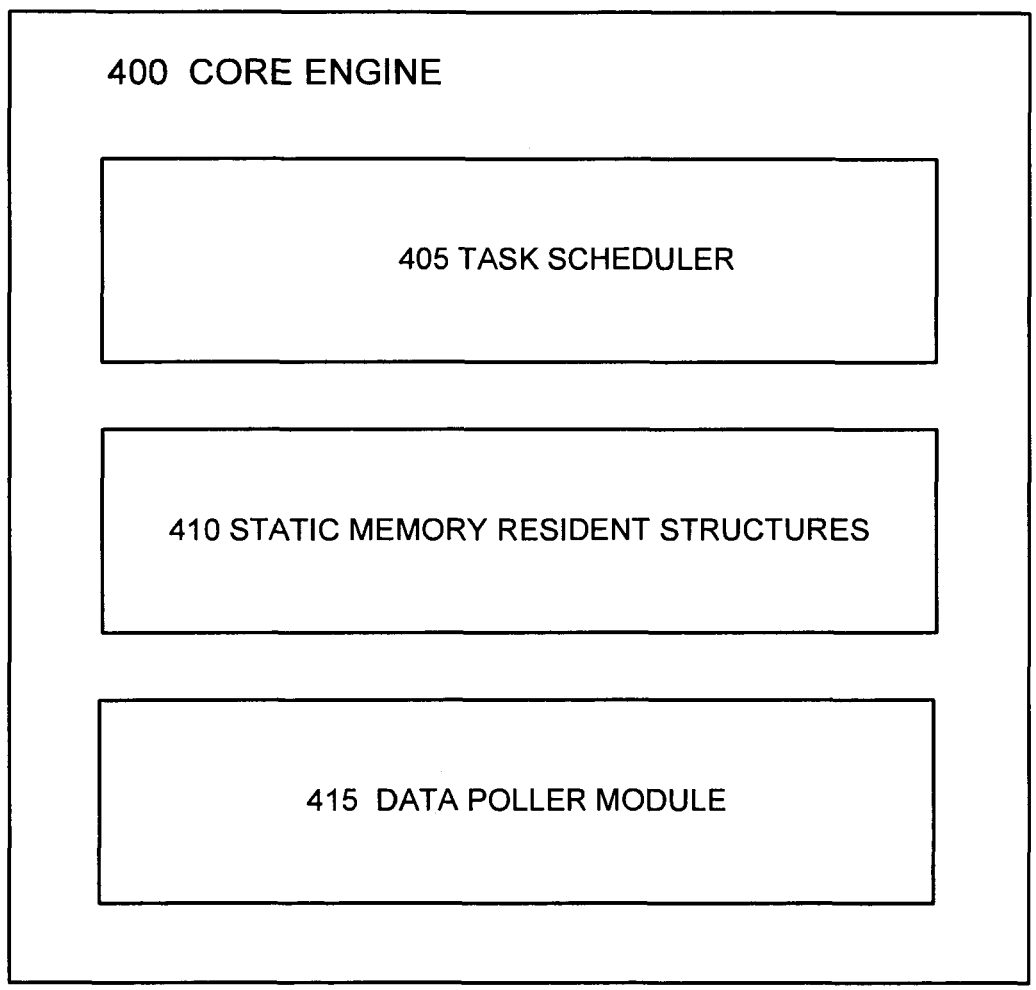
FIG. 4 illustrates the components of a core engine according to an embodiment of the present invention.

Referring to FIG. 4, the components of a core engine are illustrated according to an exemplary embodiment of the present invention. In this embodiment, the core engine reads and updates the DIDB, builds configuration files for network management tools, communicates with autocontrollers, analyzes data, imports data into the NDB, manages the failover/redundancy components for all autocontroller instances, and sends status events to event reporting modules.

The core engine 400 comprises individual software components that work together in a modular fashion to read device inventories, user access control systems and control network-monitoring systems. In an exemplary embodiment of the present invention, a task scheduler 405 is cron-run, as opposed to running as a formal daemon, in order to extend its flexibility for the many roles that it performs. In this exemplary embodiment of core engine 400, the functionality can be turned on and off via command line switches, allowing the core engine to be run in several different modes simultaneously. Therefore, one instance of the core engine 400 can be run in auto-discovery mode, detecting devices on the network, while another auto-configures tools and controls communication of the polled data flow into the back-end database. Still another instance might be correlating data between the device inventory and the actual current network topology.

In another exemplary embodiment, the core engine uses static memory resident structures 410 to hold all device and service configuration information. Although the use of static memory consumes more memory during runtime, the memory structures are protected from other systemic processes, and therefore will not be corrupted if the system runs low on memory. Furthermore, the static memory allows the program a faster runtime when compared to a dynamic memory based system, which consumes several CPU cycles while allocating, reallocating, and cleaning memory. However, this is not meant as a limitation. As will be appreciated by those skilled in the art of the present invention, the tasks of the core engine may be implemented in software and hardware in numerous ways without departing from the scope of the present invention.

In another exemplary embodiment of the present invention, the core engine comprises a data poller module (DPM) 415 for polling devices in the field via SNMP or by executing command-line interface commands on the devices being monitored to obtain updated configuration information. In this embodiment, the core engine receives updated configuration data from DPM and compares the actual status of devices in the field against the last known configuration of the devices stored on the DIDB (not shown). This comparison is done by running the DPM against a specified device and comparing the results of the poll with all of the values of the memory resident structures.

In yet another exemplary embodiment, the DPM 415 uses the SNMP and Telnet data acquisition methods, as well as Open Shortest Path First (OSPF) autodiscovery, to perform aggressive SNMP community string testing for devices with which it cannot communicate. This analysis is performed to ensure the data integrity of the DIDB and the synchronization of the NMS applications. Discrepancies found between the actual router field configuration and the database values are flagged by the modification of the status column value to "changed." An exception report in the form of an email is then generated and forwarded to a designated change control address, informing both network operations center (NOC) and support system personnel of the device change. An SNMP trap, indicating the change, is also generated and sent to the NMS server. Therefore, NOC personnel are able to compare this event with any planned tickets and act accordingly. Additionally, when the elements of a specified device are found to have differences, the core engine discerns both which device interface has changed and the old and new SNMP index values for the interface. This analysis helps preserve archived network monitoring data that is listed using a set of primary keys (SNMP Interface Index, Interface IP address, and Type/Slot).

With respect to devices that have been flagged as "changed," the core engine 400 uses the configuration values stored in the DIDB structure to configure the NMS tools (applications) to reflect the changes. The SNMP traps and email exception reports contain all relevant information regarding the elements changed and the before and after values, in order to accomplish accurate change management for each modified device. If the SNMP index values have changed and the device is flagged for monitoring via the monitoring column of the structure, an automatic reconfiguration event for all NMS tools is initiated to reflect the given change. This mechanism ensures that changes found in the network are communicated to applications across the network and flagged as exceptions for further analysis.

B. The Autocontroller

Figure 5:
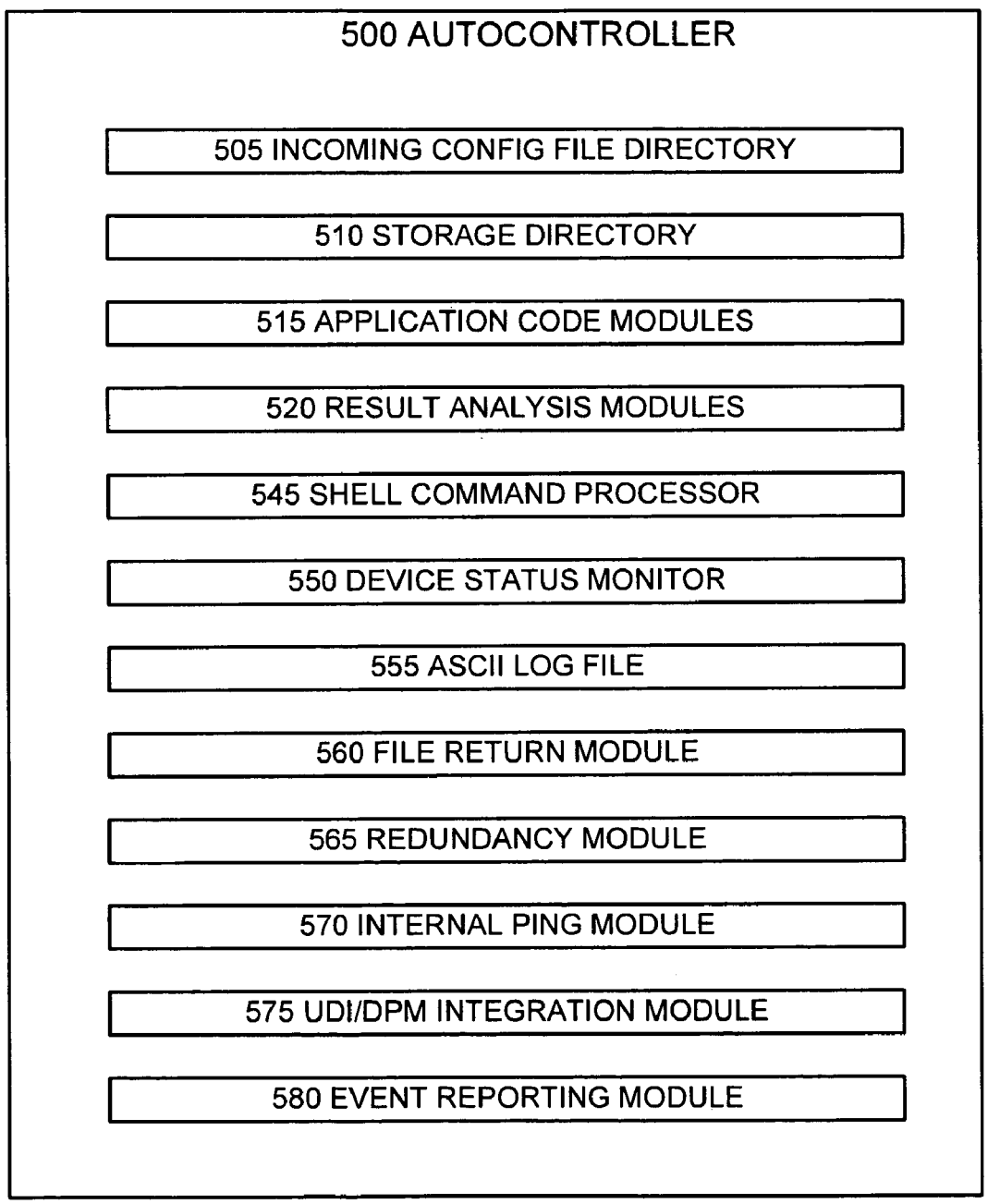
FIG. 5 illustrates the components of an autocontroller according to an embodiment of the present invention.

Referring to FIG. 5, the components of an autocontroller are illustrated according to an exemplary embodiment of the present invention. The autocontroller illustrated in FIG. 5 is illustrative of functions performed by an autocontroller according to the present invention, but the invention is not limited to the functions illustrated. As previously described, the autocontroller manages the applications running on an application server. The functions of a particular autocontroller are therefore specific to the applications that it manages.

According to the exemplary embodiment illustrated in FIG. 5, the autocontroller application is coded in a modular fashion thereby simplifying the addition of new tools (applications). The code comprises software modules that the autocontroller loads into memory, creating a simple process for modifying the autocontroller behavior towards each network management application and customizing the autocontroller to function with network management applications of various vendors. Each application under the core engine control uses the same autocontroller module, with each tool type and option selectable via command line switches. The autocontroller application is generic to any specific network management application. Each application governed by the autocontroller is unique and requires customized code for to permit the autocontroller to perform its assigned management tasks. By way of illustration, a module permits the autocontroller to stop, started, restart, manipulate, and direct an application. Because the command structure differs among applications, a unique module customized to an application is used. The process is run under cron control, with safeguards to block multiple instances, allowing better application control and a customizable run frequency.

One of the primary functions of the autocontroller is to update files for network management applications in the field with files created by the core engine. After being generated by the core engine, the freshly created configuration files, binary files, modules and the like are transferred to the appropriate application server. In an exemplary embodiment of the present invention, this transfer is accomplished via file transfer protocol (FTP) or secure protocol (SCP) and the transferred filed is stored in an incoming directory 505 to await processing. Each configuration file follows a strict naming convention that also allows for a custom (unique) component. Furthermore, the autocontroller is designed to accept program binary updates, data collection/analyzer files, and shell command files.

FIG. 6 illustrates the core engine/autocontroller transfer file formats as used in an exemplary embodiment according to the present invention. In this exemplary embodiment, the network applications are components of Netcool® Suit™ produced by MicroMuse Inc., but this is not meant as a limitation. Referring to FIG. 6, each transfer file name is broken down into four or five dot-notated words. For example:

acfile.<ID>.<unique piece>.<TAG>.[DSM]

The first word, acfile, identifies the file as one that the autocontroller should process. The <ID> represents the instance number in the meta-data configuration file. The <TAG> is one of the filename and tags listed in the table above. The optional [DSM] defines the DSM to which this file pertains, and is used by the event reporting module and applications running on the NMS poller servers. As will be apparent to those skilled in the art, other file formats capable of conveying file, TAG, and DSM identifying information may be employed without departing from the scope of the present invention.

Each application governed by the autocontroller is unique and requires customized code for such management tasks as being stopped, started, restarted, manipulated, or directed. To that end, the autocontroller has an application code module 515 dedicated to each application that it supports. Each application is tied to a command line trigger so that individual applications can be activated or not activated, as desired, depending upon the autocontroller location and purpose. According to an exemplary embodiment, if the autocontroller is commanded to check for incoming files (default behavior in an embodiment), each file listed in the incoming directory (see FIG. 5) has its filename parsed to determine whether it is a core engine transfer file. Once the filename is parsed and identified, specific action is taken depending upon the file being transferred to the autocontroller. The <ID> field ties each transfer file back to a specific application instance in the meta-data configuration file, determining the application type and location to which the file applies, as well as other details. The <TAG> field defines the type of transfer file being sent in, and thus determines the course of action to be taken regarding the contents of the file. In the case of application configuration and binary files, the files are renamed to the application standard, moved into position, and a restart of the application is scheduled. In the case of command line files (IDX), the file represents shell commands to be executed (one command per line). The [DSM] field, event reporting module, defines the role of the configuration file being propagated. In the present embodiment, DSM No. 1 is primary and DSM No. 2 is the backup file for use by a remote data center (RDC) in the event the primary data control center is unable to perform its tasks.

If the autocontroller successfully processes a given transfer file, the file is compressed and archived in a storage directory 510. If the autocontroller fails to successfully process a transfer file, it issues an alarm notification and the file remains in the incoming directory so that processing may be reattempted the next time the autocontroller launches. This allows transfer files to accumulate in the incoming directory 505, and to be processed at another time; to ensure that no change is lost should the autocontroller fail to operate for any reason.

The shell command processor 545 of the autocontroller of this exemplary embodiment fulfills several requirements. First, it is used to activate, deactivate, and restart applications, when necessary, from a centralized location. Using this feature the core engine can direct and coordinate the redundancy features of each autocontroller instance in the field. The shell command processor 545 also serves as a mechanism for data collection of non-SNMP data, such as traceroute, by listing processes running on a server and gathering statistical information about server performance that is not otherwise available through a network management tool. It can also be used in a utilitarian role to globally execute changes on all autocontroller servers (or some grouping there of). This capability grants the core engine and its autocontroller enormous flexibility and data collection capability.

The shell commands executed using this feature run from the same account as the autocontroller, which is never the root user. Each command is run individually and has its output directed to a log file that the autocontroller will later analyze and return to the core engine as a result file. This logging allows the core engine to confirm that each shell command executed properly, and provides an easy mechanism for gathering data from the field servers. The format of the shell command input file consists of each shell command to be executed on a single line of ASCII text.

According to an exemplary embodiment, a result analyzer module 520 of the autocontroller parses output files and the results from selected applications and performs actions based upon that analysis. In the exemplary embodiment, parsing comprises processing a text output file or configuration file following the execution of shell commands, reconfiguration commands, and log files by the autocontroller. The result analyzer module 520 runs after all incoming transfer files are processed and all commands and reconfigurations are complete. When the results of this analysis require that the data be returned to the core engine, output files with the appropriate naming convention are created and moved to the outgoing directory to be transferred.

In its simplest form for shell commands, the result analyzer module 520 will return the raw output of each command executed in an easy to parse format that the core engine can process. The shell commands processing files are sent to the autocontroller from the core engine, where they are executed one command at a time and the results placed in a specially formatted output file. In this manner, any desired shell commands can be run on the autocontroller server at will, providing the core engine and its autocontroller instances with great control and flexibility over their operating environment.

In a more complex context, a result analyzer module 520 is used with a DSM (distributed status monitor) 550 to analyze the results of device reconfigurations. Each time the autocontroller schedules and executes a device reconfiguration, the results of that reconfiguration are placed in an ASCII log file 555. A successful reconfiguration will result in a configuration file that a DSM will use to SNMP poll that device. These device configuration files contain valuable information about the interfaces that reside on the device, as well as a listing of each object identifier (OID) polled for the device. The result analyzer module 520 parses both of these files to determine if the reconfiguration was successful, and if so, to mine the device configuration file for critical data. This data is placed in a specially formatted output file in the outgoing directory that is picked up by the transfer file process and returned to the core engine.

A file return module 560 is used to send result files and other data from an instance of the autocontroller to the core engine servers. In an embodiment of the present invention, the file return module 560 uses both FTP and SCP as the actual transfer mechanism, both of which are selectable using command line options. The file return module 560 utilizes a user-selected outgoing directory that it will scan for files to be transferred. This process does not depend on a particular file naming convention, but rather, will transfer any file located in the outgoing directory to the core engine.

This generic operation of the file return module 560 allows the autocontroller and other applications (if required) to perform a myriad of different tasks and simply place their return output in the outgoing directory, as each task is completed. For security purposes, the autocontroller will only return files to the core engine, and not to other user-defined locations. The file return module 560 is one of the last functions performed by the autocontroller during runtime operation.

In another exemplary embodiment, each autocontroller supports a redundancy module 565. The purpose of the redundancy module is to detect failures and handle application failover. In this context, the autocontroller instances will start and stop a backup application instance, locally store critical SNMP data, and literally shut themselves down or reactivate themselves depending upon their status and the status of an assigned buddy autocontroller.

The autocontroller has an internal ping module 570 that allows it to perform pings against the core engine core and other autocontroller servers. The autocontroller also has an integration module 575 that allows it to make SNMP, I CMP, trace-route, and Web queries using a standardized XML-like messaging library. In another embodiment of the present invention, if connectivity to the core engine is lost, the autocontroller redundancy module 565 initiates a series of tasks to reestablish communication. All autocontroller instances involved will send alarm traps and e-mails, and log the event. The autocontroller will launch one or more instances of the event reporting module 580 in order to capture critical SNMP data in local files, which can then be transferred and uploaded to the NDB later. When the core engine core becomes reachable again, it commands the autocontroller to resume normal communication with the core. The backup event reporting module instances are shut down and their locally held data files are moved into the outgoing directory for transport. Once in the outgoing directory the return file module 560 will handle the actual transport back to the core engine core.

Similarly, in another exemplary embodiment of the present invention, if connectivity to a buddy autocontroller is lost the autocontroller redundancy module initiates tasks to reestablish communication with the buddy autocontroller. The following cause/effect scenarios are accounted for in this embodiment of the autocontroller redundancy module:

Cause: Connectivity to the APISCii core server is lost.
Effect:
All autocontroller instances involved will send alarm traps and e-mails, and log the event.
The autocontroller will launch one or more backup instances of the error reporting module in order to capture critical SNMP data in local files, which can then be transferred and uploaded to the NDB later.
When the core engine becomes reachable again, it commands the autocontroller to resume normal communication with the core engine.
The backup error reporting instances are shut down and their locally held data files are moved into the outgoing directory for transport.
Once in the outgoing directory the return file module will handle the actual transport back to the core engine.
Cause: Connectivity to a buddy NMS poller server is lost.
Effect:
All autocontroller instances involved will send alarm traps and e-mails, and log the event.
The autocontroller will launch a backup instance of the DSM to support and poll the devices normally polled by the unreachable buddy. This involves launching DSM No. 2 with the failed buddy NMS poller's device list. The autocontroller will maintain DSM No. 2 for a period of time after the buddy NMS poller server comes back online.
The autocontroller used by the event reporting servers will launch a modified version of event reporting module 580 for the failed buddy NMS poller server that looks at DSM No. 2 for SNMP data.

C. Core Engine Configuration

According to an exemplary embodiment of the present invention, the core engine utilizes two configuration files to perform all of its necessary operations: Meta-Configuration and object identifier (OID) configuration. These files contain specific instructions for the management of network management applications. In this exemplary embodiment, the core engine and the autocontroller use the same Meta-configuration file, which allows the core and field elements to remain completely synchronized. The configuration file is read in when the autocontroller boots. This file is broken down into three main sections using a single simplified attribute/value pair table that is designed for direct integration with the DIDB database. In this manner, the DIDB control the activities of each field autocontroller instance. The Meta-configuration file contains three fields, an integer ID field and attribute/value pair fields. The ID number determines the application instance to which each attributes/value pair belongs. The first section designates the core engine core, the second the autocontroller, and the remaining sections are for each application instance.

Referring to FIG. 7, the structure of a meta file is illustrated according to an exemplary embodiment of the present invention. In this exemplary embodiment, the network applications are components of Netcool® Suit™ produced by MicroMuse Inc. and the OpenView suit of NMS products produced by Hewlett-Packard Company, but this is not meant as a limitation. Each application instance has a unique ID number for it's each attribute/value pairs. The schema architecture of the Meta-configuration files used in this embodiment for the core engine and the autocontroller instances was chosen for several reasons. The use of a simple attribute/value pair format makes the integration with databases clean and easy to change and manipulate. The core engine and the autocontroller instances connect to the DIDB to poll the configuration file directly. This ensures that changes made to the DIDB regarding the core engine and the autocontroller take effect quickly. For redundancy purposes the autocontroller makes a local backup copy of the meta-data configuration file so that in the event the database becomes unreachable, the autocontroller is can continue to function using their last good read from DIDB.

Another attribute of this format is that it is standardized and can be easily understood. The purpose of each variable is incorporated into its name, using a logical naming convention. If more than one word comprises a variable, each word in the variable is capitalized (example: PollingSite). The meta-data design is completely extensible out to an infinite number of application instances without requiring structural changes. This feature of the configuration file is especially useful in network management systems with large network device inventories.

The meta-data format further accommodates the creation and propagation of the same network management tool's configuration file to several locations. For example, multiple instances of an application may unique instances defined in the configuration file. Because both the core engine and each autocontroller use the same configuration file, the core engine core and the inventory of autocontrollers are always synchronized with one another.

At application boot time, the autocontroller attempts to connect to the DIDB and read its meta-configuration file using scripts. If this succeeds, a fresh local backup of the meta-configuration is saved to disk. If it fails, the autocontroller issues an alarm and falls back to the last known good copy of the meta-configuration file stored on disk. Once the meta-configuration file is read, it is stored in memory structures that mimic the file structure.

Referring to FIG. 8, the structure of an object identifier (OID) configuration file is illustrated according to an exemplary embodiment of the present invention. The object identifier configuration file provides a mechanism for specifying how SNMP OIDs are gathered. Each device and device interface can have a custom list of OIDs that are polled and expected back via a report of that data. The autocontroller uses this configuration data to build the event reporting module configuration files, which specify the OID data required from each device in the field.

As illustrated in FIG. 8, the OID configuration file comprises:

- a Loopback IP the IP address of the device listed in the DIDB. This field acts as the primary key for each device;
- SNMP index—the integer SNMP index value for the device interface to which this OID applies. A value of '0' indicates that the OID is a chassis OID and thus does not apply to any interface. The value of '−1' indicates that the OID should apply to all interfaces on the device;
- OID—the dot-notated form of the OID being polled;
- Polling frequency—how often the OID is to be polled in seconds. A value of 300 thus indicates that the OID is to be polled once every five minutes; and
- Status—an integer binary (0/1) that determines whether the OID is active or inactive. In the exemplary embodiment, the status field is used to turn off regularly scheduled polling of four OIDs during outages, maintenance windows, failover scenarios, and the like.

The OID configuration file is similar in structure to a base configuration file, with the addition of two fields—'Polling Interval' and 'Status'. The format thus allows each device and device interface known to the DIDB to have OIDs defined at custom intervals for retrieval, storage in the NDB, and reporting. Another similarity to the base meta-configuration file is that the OID configuration file is prepared from a table in the DIDB schema, and the same OID configuration file is used by all autocontroller instances.

OTHER EMBODIMENTS

The present invention has been described in the context of a network manage system in which the data to be synchronized comprises configuration data. The invention is not so limited. In another embodiment, the "network" is a distributed financial system and the data to be synchronized financial variables that are used by various applications of the financial system. In this embodiment, the central database receives reports of changes in financial variables from information gathering applications across a financial network. The core engine monitors the central data structure, determines if a financial variable has changed within the network, then populates the changes to all network applications. In this way, the financial network is "synchronized" as to the variables that are deemed important to the functioning of the financial network. As those skilled in the art of the present invention will appreciate, the present invention can be applied to any system in which disparate components benefit from synchronization (such as billing systems and weather systems) without departing from the scope of the present invention.

A system and method for the configuration of distributed network management applications and devices has now been illustrated. The management of these devices and applications (sometimes collectively referred to as "objects") is performed without human intervention. Although the particular embodiments shown and described above will prove to be useful in many applications relating to the arts to which the present invention pertains, further modifications of the present invention herein disclosed will occur to persons skilled in the art. All such modifications are deemed to be within the scope of the present invention as defined by the appended claims.

What is claimed is:

1. A change management system comprising:
   a network management object connected to a network, wherein the network management object is associated with network management object configuration information;
   a datastore, wherein the datastore comprises last known configuration information associated with the network management object; and
   a core engine connected to the network, wherein the core engine comprises instructions for:
      polling the network management object for current configuration information of the network management object;
      receiving the current configuration information from the network management object;
      making a determination as to whether the current network management object configuration information is different from the last known network management object configuration information as stored in the datastore;
      when the current network management object configuration information is different from the last known network management object configuration information, then processing the current network management object configuration information received from the network management object to obtain a new network management object configuration file;
      identifying an application on a network application server that uses the configuration information of the network management object; and
      sending the new network management object configuration file to the network application server on which the identified application resides.

2. The system of claim 1, wherein the network management object comprises a configurable device.

3. The system of claim 2, wherein the device is selected from the group consisting of a switch, a modem, and a server.

4. The system of claim 1, wherein the network management object comprises a configurable application.

5. The system of claim 4, wherein the configurable application is selected from the group consisting of a poller, a reporting engine, a network portal, and an access control server.

6. The system of claim 1, wherein the core engine further comprises instructions for updating the datastore with the current network management object configuration information of the network management object.

7. The system of claim 1, wherein the network management object has no last known configuration information.

8. The system of claim 1 further comprising a controller server associated with the network application server on which the identified application resides, wherein the controller server comprises instructions for:
   receiving the new network management object configuration file;
   converting the new network management object configuration file into a format accepted by the identified application; and
   updating a configuration of the identified application with the converted configuration file.

9. The system of claim 8, wherein the controller server further comprises instructions for:
   determining whether the identified application is successfully updated; and
   when the identified application is not successfully updated, issuing an alert.

10. The system of claim 1 further comprising a controller server associated with the network application server and with a buddy network application server, wherein the controller server comprises instructions for:
- monitoring connectivity between the application server and the buddy network application server;
- when the connectivity between the network application server and the buddy network application server is lost, then launching on the network application server a backup instance of an application operated by the buddy network application server;
- operating the back-up instance of the application on the network application server so as to perform the tasks of the buddy network application server;
- monitoring the connectivity between the network application server and the buddy network application server; and
- when the connectivity between the network application server and the buddy network application server is restored, then shutting down the backup instance of the application on the network application server.

11. The system of claim 1, wherein the network is selected from the group consisting of a hybrid fiber network, a wired network, and a wireless network.

12. The system of claim 1, wherein the network is the Internet.

13. The system of claim 1, wherein the network is an intranet.

14. A method for managing change on a network, wherein the network comprises a network management object connected to the network and wherein the network management object is associated with network management object configuration information, the method comprising:
- polling the network management object for current configuration information;
- receiving the current network management object configuration information from the network management object;
- accessing a datastore comprising last known configuration information associated with the network management object;
- determining whether the current network management object configuration information is different from the last known network management object configuration information as stored in the datastore;
- when the current network management object configuration information is different from the last known network management object configuration information, then processing the current network management object configuration information received from the network management object to obtain a new network management object configuration file;
- identifying an application that uses the configuration information of the network management object; and
- sending the new network management object configuration file to the network application server on which the identified application resides.

15. The method of claim 14, wherein the network management object comprises a configurable device.

16. The method of claim 15, wherein the device is selected from the group consisting of a switch, a modem, and a server.

17. The method of claim 14, wherein the network management object comprises a configurable application.

18. The method of claim 17, wherein the configurable application is selected from the group consisting of a poller, a reporting engine, a network portal, and an access control server.

19. The method of claim 14 further comprising updating the datastore with the current network management object configuration information of the network management object.

20. The method of claim 14, wherein the network management object has no last known network management object configuration information.

21. The method of claim 14, wherein the network further comprises a controller server associated with the network application server on which the identified application resides and wherein the method further comprises:
- receiving at the controller server the new network management object configuration file;
- converting the new network management object configuration file into a format accepted by the identified application; and
- updating a configuration of the identified application with the converted configuration file.

22. The method of claim 21 further comprising:
- determining whether the identified application is successfully updated; and
- when the identified application is not successfully updated, issuing an alert.

23. The method of claim 14, wherein the network further comprises a buddy network application server and wherein the method further comprises:
- monitoring connectivity between the network application server and a buddy network application server;
- when the connectivity between the network application server and the buddy network application server is lost, then launching on the network application server a backup instance of an application operated by the buddy network application server;
- operating the backup instance of the application on the network application server so as to perform the tasks of the buddy network application server on the network application server;
- monitoring the connectivity between the network application server and the buddy network application server; and
- when connectivity between the network application server and the buddy network application server is restored, then shutting down the backup instance of the application on the network application server.

24. The method of claim 14, wherein the network is selected from the group consisting of a hybrid fiber network, a wired network, and a wireless network.

25. The method of claim 14, wherein the network is the Internet.

26. The method of claim 14, wherein the network is an intranet.

* * * * *